(12) United States Patent
Reis et al.

(10) Patent No.: US 6,258,431 B1
(45) Date of Patent: *Jul. 10, 2001

(54) GAP STANDARDIZATION TECHNIQUE FOR SPECIALIZED FILLERS

(75) Inventors: Carl Andrew Reis, Torrance; Robert Warner Koon, Westminster, both of CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/656,073

(22) Filed: Sep. 5, 2000

Related U.S. Application Data

(62) Division of application No. 09/190,892, filed on Nov. 12, 1998, now Pat. No. 6,136,116.

(51) Int. Cl.[7] .............................. B32B 35/00; B64C 1/12
(52) U.S. Cl. ........................... 428/63; 428/220; 244/131; 244/133; 52/459
(58) Field of Search ........................... 156/71, 94, 97, 156/293, 297, 299, 304.1, 304.5; 244/131, 133; 428/63, 220; 52/459

(56) References Cited

U.S. PATENT DOCUMENTS

| | | | |
|---|---|---|---|
| 2,856,650 | 10/1958 | Hildebrand | 20/56.5 |
| 2,860,740 | 11/1958 | Holland et al. | 189/36 |
| 4,587,761 | 5/1986 | Adell | 49/462 |
| 5,065,960 | 11/1991 | Castellucci | 244/131 |
| 5,424,105 | 6/1995 | Stewart | 428/40 |
| 5,516,185 | 5/1996 | O'Donnell et al. | 296/166 |
| 5,695,154 | 12/1997 | Castellucci et al. | 244/130 |
| 5,829,936 | 11/1998 | Omori et al. | 411/509 |
| 5,845,440 | 12/1998 | Matsuyama | 52/235 |
| 5,916,394 | 6/1999 | Prochaska et al. | 156/83 |
| 5,921,859 | 7/1999 | Foster | 454/131 |

Primary Examiner—Sam-Chuan Yao
(74) Attorney, Agent, or Firm—Terry J. Anderson; Karl J. Hoch, Jr.

(57) ABSTRACT

A system is provided for filling a gap between adjoining coplanar first and second sheet members mounted on an outer surface of a common substrate and having juxtaposed first and second edge surfaces. A permanent gap filler member of predetermined shape and size intended for eventual permanent reception in the gap is employed for partially filling the gap. A temporary gap filler tool which includes a substitute gap filler element having substantially the same predetermined size and shape of the permanent gap filler member, has an abutting surface for contiguous engagement with the first edge surface of the first sheet member when advanced to an attached position before the permanent gap filler member is mounted in the gap, a minor gap surface facing opposite said abutting surface, and means for releasably attaching the temporary gap filler tool to the first sheet member. A minor gap is thereby defined between the temporary gap filler element and the second edge surface of the second sheet member. Fairing material is initially laid down as an epoxy resin slurry in a minor gap resulting between the substitute gap filler element and the second edge surface of the second sheet member, then cured to hardened form having a substitute second edge surface contiguous with the minor gap surface of the substitute gap filler element. Thereafter, the temporary gap filler is removed from the gap and the permanent gap filler member is inserted and bonded to the common substrate resulting in the entire gap being filled.

10 Claims, 5 Drawing Sheets

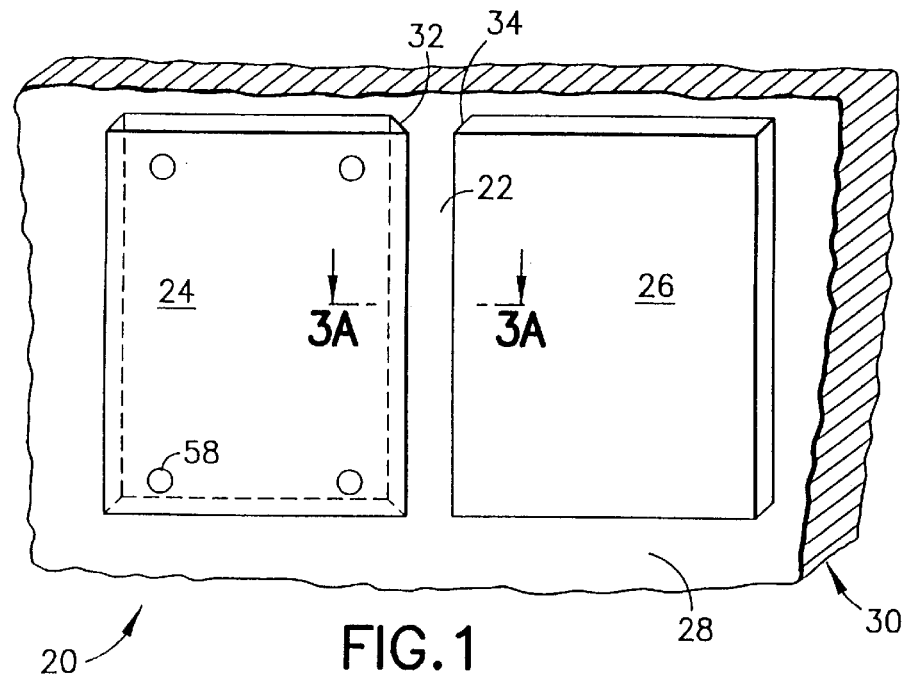
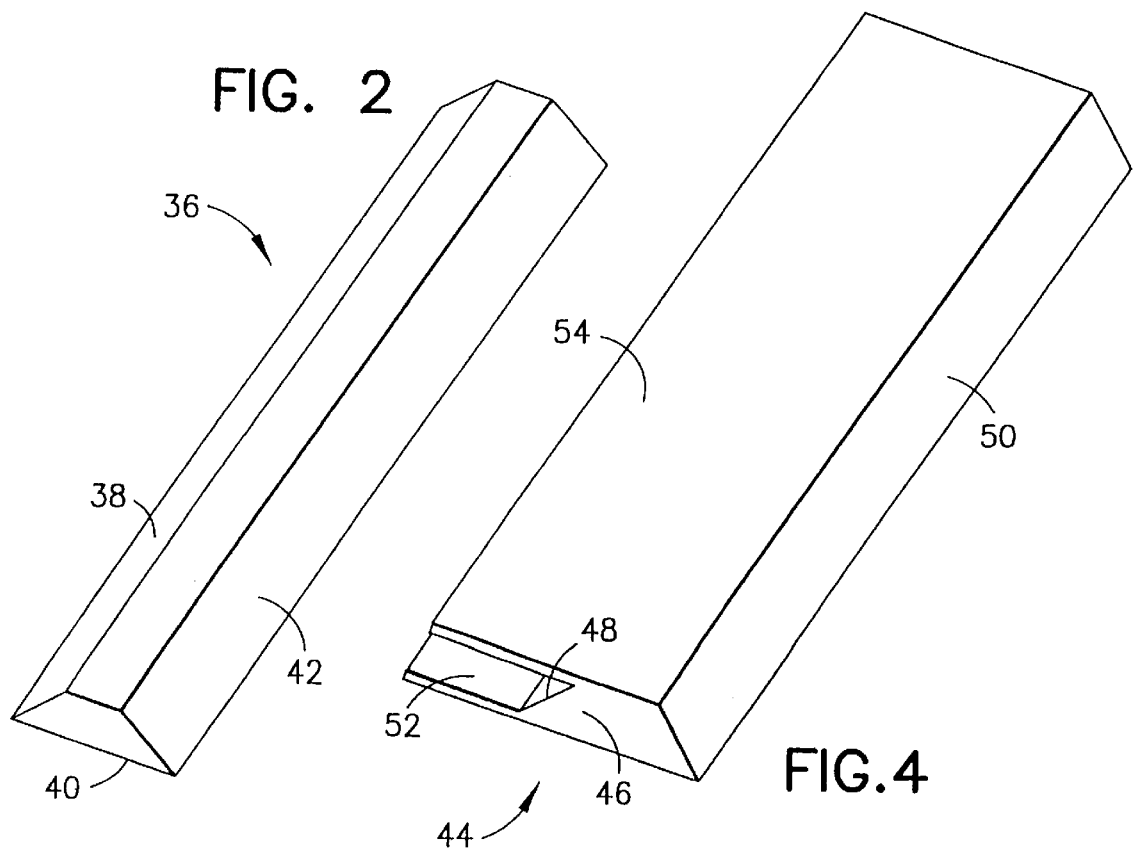

GAP STANDARDIZATION TECHNIQUE FOR SPECIALIZED FILLERS

This application is a divisional of application Ser. No. 09/190,892 filed on Nov. 12, 1998 now U.S. Pat. No. 6,136,116.

BACKGROUND OF THE INVENTION

1. Field of the Invention

The present invention relates generally to methods and apparatus for filling gaps of various shapes and sizes between adjoining panels and the like and, more particularly, to an improved technique using pre-cured gap fillers of predetermined shapes and sizes. Gaps require filling with materials which exhibit suitable conductivity for electromagnetic shielding and other purposes.

2. Description of the Prior Art

There have been long-standing efforts to improve known techniques for filling or covering permanent and access panel gaps by use of sealants, caulks and tapes, especially with respect to aircraft skins, although the invention is not necessarily so limited. The mentioned materials provide continuity between inconsistent widths and depths of these gaps. Maintainability of these systems significantly impacts the aircraft's mission readiness and end users have requested that cure and maintenance times be shortened to minutes or hours rather than days or weeks.

Pre-cured gap fillers offer substantial reductions in maintenance times and simplified processes. Installation in gaps of varying shapes and sizes, however, has previously prevented serious consideration of pre-cured filler concepts. This invention describes an improved process for standardizing existing gap configurations which allows for simple installation and maintenance using pre-cured gap treatments.

The following patents are generally indicative of the prior art at the time the invention was conceived.

U.S. Pat. No. 4,587,761 to Adell discloses an edge guard and method whereby the edge guard is used to substantially fill the gap between the trailing edge of a door onto which the edge guard is installed and an adjacent portion of the vehicle body. In the case of a two-door model car and the rear door of a four-door model car, the adjacent body structure is a pillar or post. In the case of the front door of a four-door model the adjacent body structure may be the front edge of the rear door. When the rear door swing is such that the front edge swings slightly forwardly when the door is opened, provision is made so that the front edge of the rear door does not hit the edge guard on the front door. The edge guard is characterized by inner and outer legs of substantially longer length than other edge guards whereby the edge guard may have a variable engagement with the door edge to permit adjustment for a range of different thicknesses of gap. A hardenable filler material is introduced during installation of an edge guard and is pliable at this stage to permit the edge guard to be adjusted. It subsequently sets to a hardened condition to provide a substantially permanent locator for the adjusted door edge guard. The edge guard is enclosed with protective insulation whose color matches that of the door and adjacent body structure whereby both the edge guard and the gap are substantially de-emphasized thereby promoting sleekness in the appearance of the automobile.

It was with knowledge of the foregoing state of the technology that the present invention has been conceived and is now reduced to practice.

SUMMARY OF THE INVENTION

The present invention relates to a system for filling a gap between adjoining coplanar first and second sheet members mounted on an outer surface of a common substrate and having juxtaposed first and second edge surfaces. A permanent gap filler member of predetermined shape and size intended for eventual permanent reception in the gap is employed for partially filling the gap. A temporary gap filler tool which includes a substitute gap filler element having substantially the same predetermined size and shape of the permanent gap filler member, has an abutting surface for contiguous engagement with the first edge surface of the first sheet member when advanced to an attached position before the permanent gap filler member is mounted in the gap, a minor gap surface facing opposite said abutting surface, and means for releasably attaching the temporary gap filler tool to the first sheet member. A minor gap is thereby defined between the temporary gap filler element and the second edge surface of the second sheet member. Fairing material is initially laid down as an epoxy resin slurry in a minor gap resulting between the substitute gap filler element and the second edge surface of the second sheet member, then cured to hardened form having a substitute second edge surface contiguous with the minor gap surface of the substitute gap filler element. Thereafter, the temporary gap filler is removed from the gap and the permanent gap filler member is inserted and bonded to the common substrate resulting in the entire gap being filled.

More specifically, with respect to access panel edges for an aircraft, for example, a silicone rubber sleeve in the shape of a parallelogram and/or other suitable geometry is slid over the access panel edge and remains in place while the rest of the gap is filled with a filler of epoxy resin or other suitable material. Sleeve configurations have a thin flashing, or flanges, on both sides to hold the sleeve in place over the panel edge. This sleeve is placed on the access panel while removed from the aircraft and then the access panel located by fastening in place. A potting material, either conductive itself or loaded with metal, metal covered spheres or oriented/random fibers or nonconductive material replaces missing material in the gap. The epoxy resin may be potted in place or cast on the aircraft as a permanent fix. Pre-cured beads of current and future conductive elastomers can now be fitted in the gap and loaded under compression when the door is fastened down.

With respect to permanent gaps, permanent panels are able to use a precured elastoiner bead or a bond in place gasket in the shape of a parallelogram and/or other geometry. The pre-cured bead can be permanently bonded in place or a gasket can be removed after the epoxy resin has cured and the pre-cured gap filler can then be pressed into the gap.

A primary feature, then, of the present invention is the provision of a novel technique for filling gaps of various shapes and sizes between adjoining panels and the like.

Another feature of the present invention is the provision of such a novel technique using pre-cured gap fillers of predetermined shapes and sizes.

Still another feature of the present invention is the provision of such a novel technique which results in a low cost retrofit.

Yet another feature of the present invention is the provision of such a novel technique which allows the use of pre-cured gap fillers.

Still a further feature of the present invention is the provision of such a novel technique which results in decreased maintenance man hours.

Yet a further feature of the present invention is the provision of such a novel technique which assures shorter cure cycles.

Still another feature of the present invention is the provision of such a novel technique which is light weight, inexpensive, and uses readily available materials.

Still a further feature of the present invention is the provision of such a novel technique which reduces employee exposure to hazardous materials and reduces the hazardous waste stream.

Still another feature of the present invention is the provision of such a novel technique which is not temperature or humidity dependent.

Yet another feature of the present invention is the provision of such a novel technique which allows for next generation materials.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

BRIEF DESCRIPTION OF THE DRAWINGS

FIG. 1 is an elevation view of a typical outer surface region, for example, of a modern aircraft to which the invention can be applied to fill an existing gap;

FIG. 2 is a perspective view of a permanent gap filler member intended for permanent placement in the gap illustrated in FIG. 1;

FIG. 3A, but illustrating successive steps in the method of the invention;

FIG. 4 is a perspective view of a temporary gap filler tool intended for temporary use in performing the method of the invention;

DETAILED DESCRIPTION OF THE PREFERRED EMBODIMENTS

Figure 3A:
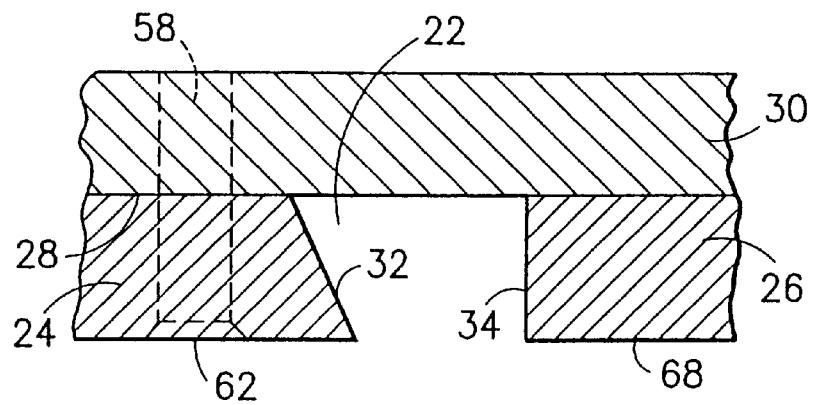
FIG. 3A is a detail cross section view taken generally along line 3A—3A in FIG. 1.
Figure 3B:
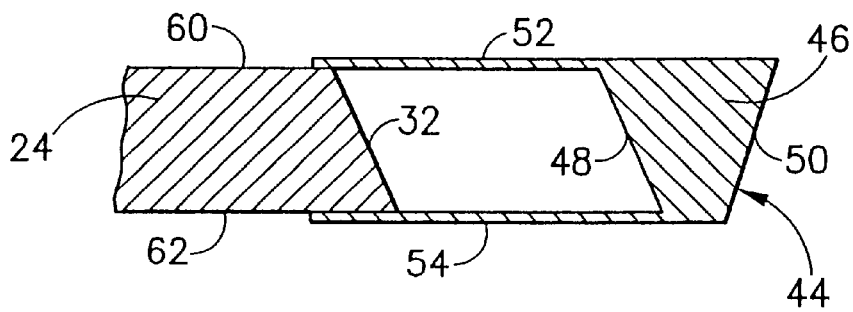
FIGS. 3B–3F are detail cross section views, each generally similar to FIG.
Figure 3C:
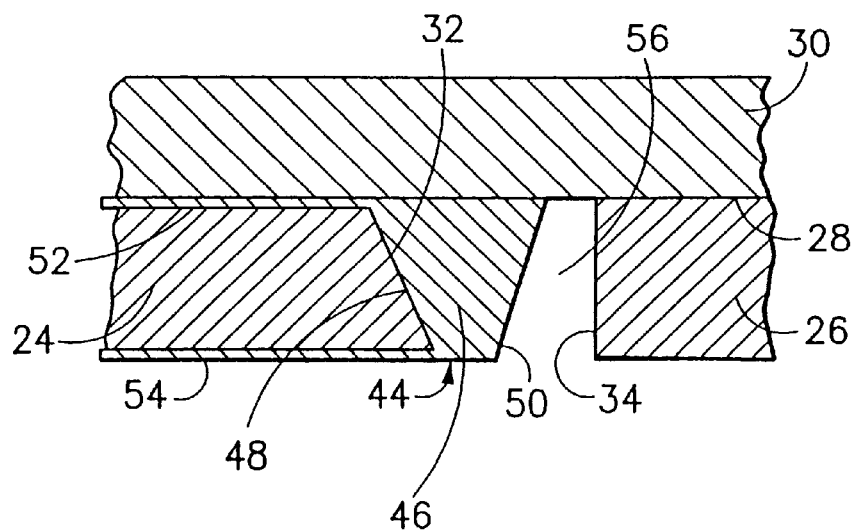

Turn now to the drawings and, initially, to FIG. 1 which generally illustrates a typical outer surface region 20 of a modern aircraft. The invention relates to an improved system which is employed to fill a gap 22 between adjoining coplanar sheet members 24, 26 mounted on an outer surface 28 of a common substrate 30, for example, the outer skin of the aircraft, and having juxtaposed edge surfaces 32, 34, respectively.

The concept of the invention is to provide a permanent gap filler member 36 (see FIG. 2) of predetermined shape and size for eventual reception in the gap for partially filling the gap. Turn now to FIGS. 3A–3F which serve to illustrate a series of steps which will result in the complete filling of the gap 22 as seen in FIG. 3F and depicting such partial filling of the gap by means of the permanent gap filler member 36. The permanent gap filler member 36 has an abutting surface 38 which, when received in the gap 22 is in contiguous engagement with the edge surface 32 of the sheet member 24, a mounting surface 40 for contiguous engagement with the outer surface 28 of the common substrate 30, and a minor gap surface 42 opposite the abutting surface 38.

Continuing with reference to FIGS. 3A–3F and referring also to FIG. 4, a temporary gap filler tool 44 is utilized by the invention which includes a substitute gap filler element 46 having substantially the same predetermined size and shape of the permanent gap filler member 36. The substitute gap filler element 46 has an abutting surface 48 for contiguous engagement with the edge surface 32 of the sheet member 24 before the permanent gap filler member 36 is mounted in the gap 22, a minor gap surface 50 facing opposite the abutting surface 48, and spaced apart flange members 52, 54, respectively. The flange members 52, 54 serve to releasably attach the temporary gap filler tool 44 to the sheet member 24 so that the abutting surface 48 is contiguously engaged with the edge surface 32 in the same manner as the permanent gap filler member 36 when the entire procedure is completed, as seen in FIG. 3F.

The temporary gap filler tool 44 is advanced from a generally detached position (FIG. 3B) to a completely attached position (FIG. 3C) whereat the abutting surface of the substitute gap filler element is in contiguous engagement with the edge surface 32 of the sheet member 24 such that the Mange members 52, 54 are in contiguous sidable engagement, respectively, with respective outer surfaces 60, 62 of the sheet member 24. When the abutting surface 48 of the temporary gap filler tool is contiguously engaged with the edge surface 32, a minor gap 56 is thereby defined which exists between the temporary gap filler element 46 and the edge surface 34 of the sheet member 26.

In the instance illustrated in FIGS. 1 and 3A–3F, the sheet member 26 is permanently mounted on the common substrate 30 while the sheet member 24 may be a door or removable panel releasably attached by means of suitable fasteners 58. With this configuration, the edge surface 32 may be beveled while the edge surface 34 is normal or perpendicular to the outer surface 28 of the common substrate 30. Such being the case, the gap 22 has a trapezoidal cross section (FIG. 3A) and the permanent gap filler member 36 and the substitute gap filler element 46 both have a trapezoidal cross section.

Figure 3D:
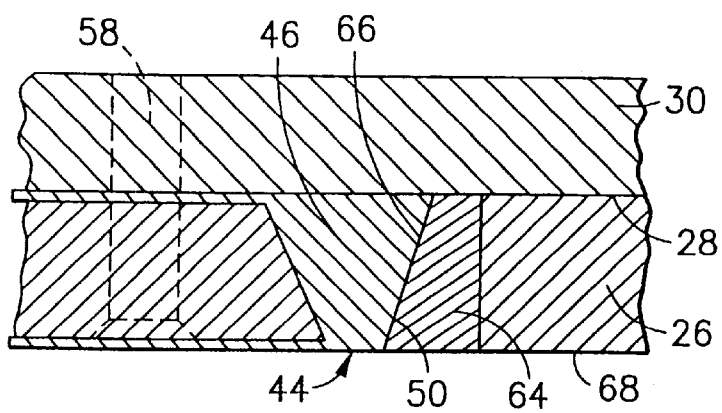
Figure 3F:
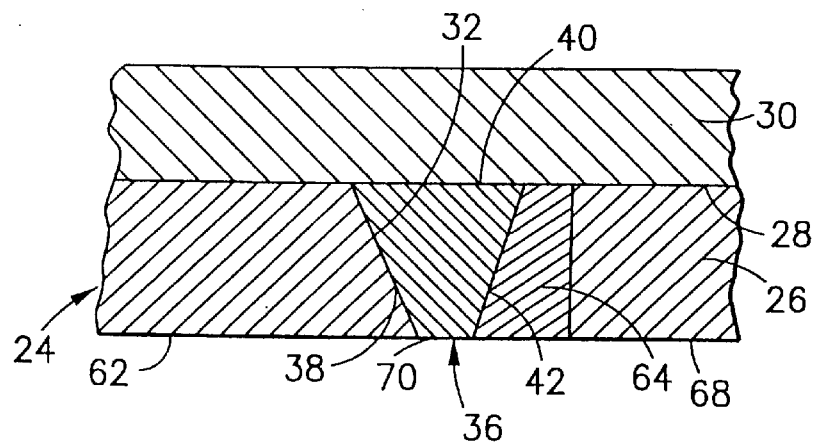
Figure 3E:
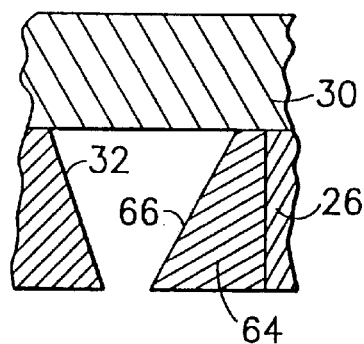
Figure 5A:
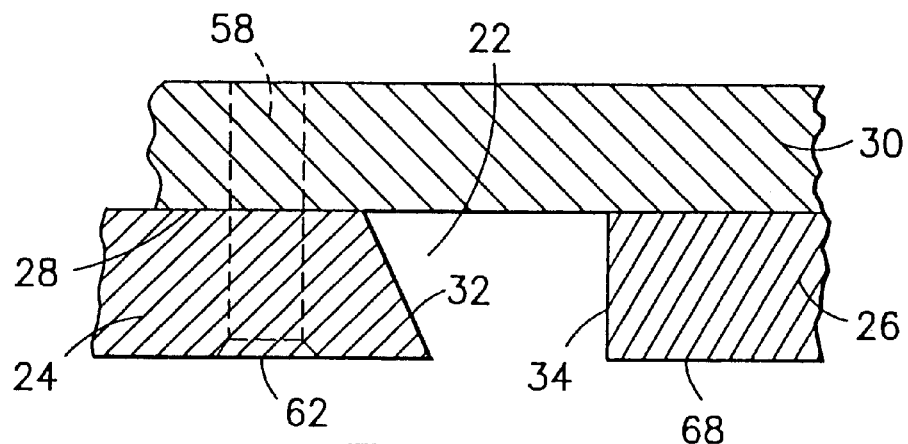
FIG. 5A is a detail cross section view similar to FIG. 3A but illustrating another embodiment of the invention.
Figure 5B:
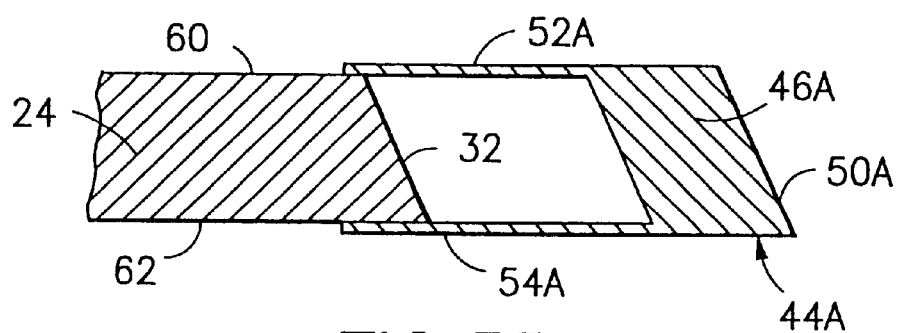
FIGS. 5B–5F are detail cross section views, each generally similar to FIG. 5A, but illustrating successive steps in this other embodiment of the invention.
Figure 5C:
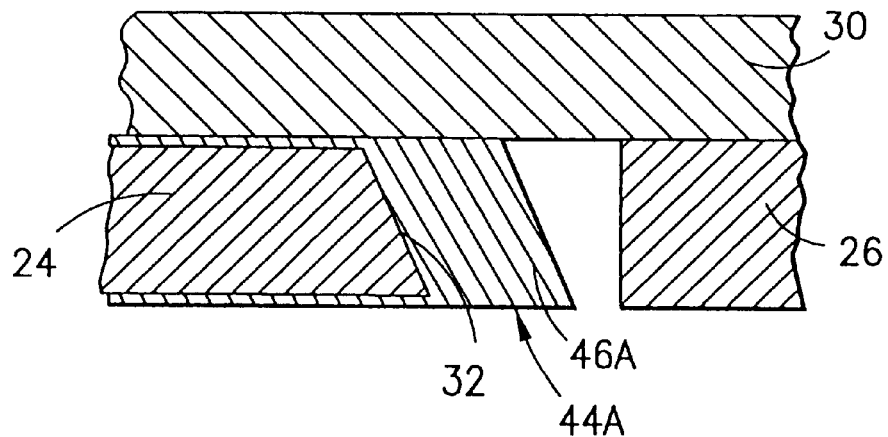
Figure 5D:
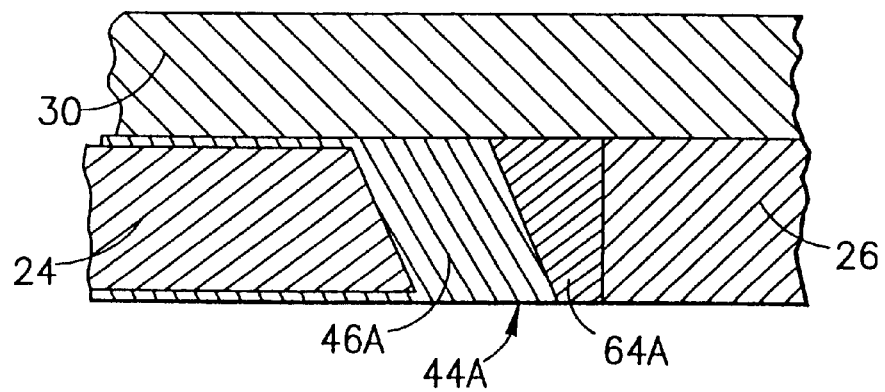
Figure 5F:
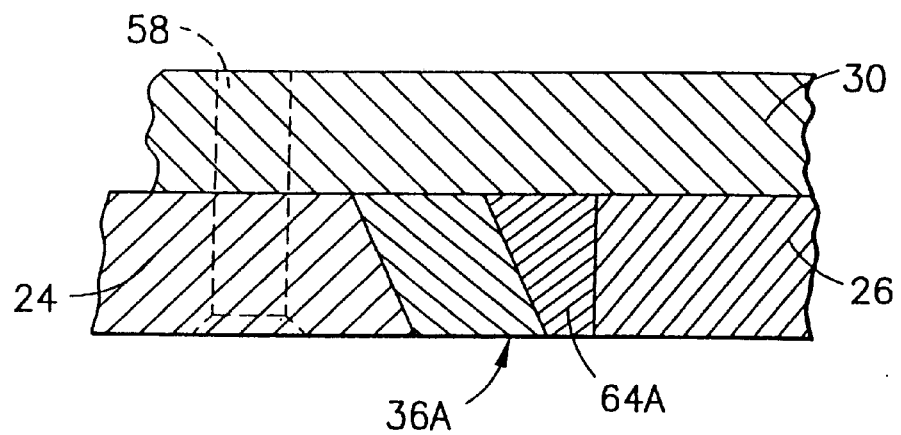
Figure 5E:
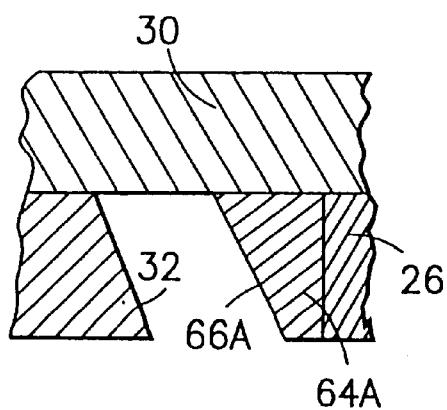

Thereupon, viewing FIG. 3D, fairing material is introduced into the minor gap 56, initially laid down as a slurry of suitable material such as an epoxy resin, then cured to hardened form resulting in formation of a fairing member 64. When cured, the fairing member 64 has a substitute edge surface 66 contiguous with the minor gap surface 50 of the substitute gap filler element 46. Also, after the fairing member has cured, the sheet member 24 is temporarily removed from the common substrate 30 and the temporary gap filler tool 44 removed from the sheet member 24. Then the sheet member 24 is re-attached to the common substrate 30 (FIG. 3E) and the permanent gap filler member 36 is fixedly attached, as by bonding, to the outer surface 28 of the common substrate 30 with the abutting surface 38 in contiguous engagement with the edge surface 32 of the sheet member 24 and with the minor gap surface 42 in contiguous engagement with the substitute edge surface 66 of the fairing member 64.

It is generally considered that the sheet members 24, 26 have outer surfaces 62, 68, respectively, which are coplanar.

When the construction illustrated in FIG. 3F has been achieved, an outer surface 70 of the permanent gap filler member 36 opposite the mounting surface 40 is substantially coplanar with the outer surfaces 62, 68. All of these surfaces may then be sanded or otherwise smoothened, then painted to complete the effort of filling the gap 22. In circumstances where a precured bead is used which is pigmented to match the coloring of the surfaces 62, 68 then painted is performed at the prior step in the process represented by FIG. 3E.

It may be desirable to construct the permanent gap filler member 36 slightly larger than the substitute gap filler element 46 so as to cause a fitting relationship among the sheet member 24, the permanent gap filler member itself, the fairing member 64, and the common substrate 30 when the permanent gap filler member is permanently attached to the common substrate.

Another embodiment of the invention is illustrated in FIGS. 5A–5F which illustrate a series of steps similar to those illustrated in FIGS. 3A–3F. In this instance, however, a permanent gap filler member 36A and substitute gap filler element 46A have a parallelogram shaped cross section. In this instance, while the edge surface 32 may be beveled, as illustrated, it may also be normal or perpendicular to the outer surface 28 of the common substrate 30 such that the substitute gap filler element 46A actually has a rectangular cross section (not shown). The preceding description with respect to the embodiment illustrated in FIGS. 3A–3F is applicable to the embodiment illustrated in FIGS. 5A–5F with the understanding that all reference numerals in the latter instance carry an "A" suffix.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A system for filling a gap between adjoining coplanar first and second sheet members, each having opposed inner and outer surfaces, mounted on an outer surface of a common substrate and having juxtaposed first and second edge surfaces, respectively, said system comprising;

a permanent gap filler member of predetermined shape and size for eventual reception in the gap for partially filling the gap, the permanent gap filler member having an abutting surface which, when received in the gap is in contiguous engagement with the first edge surface of the first sheet member a mounting surface for contiguous engagement with the outer surface of the common substrate, and a minor gap surface opposite said abutting surface;

a temporary gap filler tool including a substitute gap filler element having substantially the same predetermined size and shape of the permanent gap filler member, the substitute gap filler element having an abutting surface for contiguous engagement, before said permanent gap filler member is mounted in the gap, with the first edge surface of the first sheet member, a minor gap surface facing opposite said abutting surface, and means for releasably attaching said temporary gap filler tool to said first sheet member so that said abutting surface of said substitute gap filler element is contiguously engaged with the first edge surface of the first sheet member in the same manner as said permanent gap filler member wherein said means for releasably attaching said temporary gap fillet tool includes a pair of spaced apart flange members projecting away from the abutting surface such that the flange members are in contiguous slidable engagement, respectively, with the inner and outer surfaces of the first sheet member, thereby defining a minor gap existing between said temporary gap filler element and the second edge surface of the second sheet member;

fairing material in the minor gap existing between said substitute gap filler element and the second edge surface of the second sheet member initially laid down as a slurry, then cured to hardened forming having a substitute second edge surface contiguous with the minor gap surface of the substitute gap filler element;

said permanent gap filler member being fixedly attached to the outer face of the common substrate upon removal of said temporary gap filler tool from the first sheet member with the abutting surface in continuous engagement with the first edge surface of the first sheet member and with said minor gap surface in contiguous engagement with said substitute second edge surface of said fairing member;

whereby the entire gap is filled.

2. A system for filling a gap as set forth in claim 1 wherein said permanent gap filler member is slightly larger than said substitute gap filler element of said temporary gap filler tool so as to cause a fitting relationship among the first sheet member, said permanent gap filler member, said fairing member, and the common substrate when said permanent gap filler member is permanently attached to the common substrate.

3. A system for filing a gap as set forth in claim 1 wherein the first and second sheet members have outer surfaces which are coplanar;

wherein said permanent gap filler member has an outer surface opposite said mounting surface; and wherein said outer surface of said permanent gap filler member is substantially coplanar with the outer surfaces of the first and second sheet members when permanently attached to the common substrate.

4. A system for filling a gap as set forth in claim 1 wherein the first edge surface of the first sheet member is beveled with respect to the outer surface of the common substrate;

wherein the second edge surface of the second sheet member is perpendicular to the outer surface of the common substrate; and wherein said abutting surface of said substitute gap filler element is similarly beveled to the first edge surface of the first sheet member for contiguous engagement therewith.

5. A system for filling a gap as set forth in claim 1 wherein the first and second edge surfaces of the first and second sheet members, respectively, are perpendicular to the outer surface of the common substrate; and wherein said abutting surface of said substitute gap filler element is similarly perpendicular for contiguous engagement with the first edge surface of the first sheet member.

6. A system for filling a gap as set forth in claim 1 wherein said permanent gap filler member is fixedly attached to the outer face of the common substrate by bonding.

7. A system for filling a gap as set forth in claim 1 wherein the first sheet member has an outer surface; and wherein said temporary gap filler tool includes a guide member for guidance as it advances from a detached position to an attached position whereat the abutting surface of said substitute gap filler element is in contiguous engagement with the first edge surface of the first sheet member such that said guide member is in contiguous slidable engagement, respectively, with the outer surface of the first sheet member.

8. A system for filling a gap as set forth in claim 1 wherein said slurry resulting in said fairing member is an epoxy resin system.

9. A system for filling a gap as set forth in claim 1 wherein said permanent gap filler member and said substitute gap filler element both have a cross section for partially filling the gap shaped in the form of a trapezoid.

10. A system for method filling a gap as set forth in claim 1 wherein said permanent gap filler member and said substitute gap filler element both have a cross section for partially filling the gap shaped in the form of a parallelogram.

* * * * *